3,544,502
LATEX STABILIZED WITH SALTS OF POLYMETHYLATED MUCONIC ACIDS
Jackson S. Boyer, Claymont, Del., and Richard D. Cassar, West Chester, Pa., assignors to Sun Oil Company, Philadelphia, Pa., a corporation of New Jersey
No Drawing. Continuation-in-part of application Ser. No. 691,199, Dec. 18, 1967. This application May 23, 1968, Ser. No. 731,619
Int. Cl. C08c 7/10; C08d 7/10
U.S. Cl. 260—29.7
16 Claims

ABSTRACT OF THE DISCLOSURE

Stabilized aqueous latex emulsion compositions and methods of their preparation, comprising a rubber latex emulsion containing 0.05 to 10.0 weight percent based on the weight of the whole composition of the alkali and/or the alkaline earth metal salts of certain polymethylated muconic acids.

CROSS REFERENCE TO RELATED APPLICATIONS

The present application is a continuation-in-part of copending application, Ser. No. 691,199 and is also related to patent applications, Ser. Nos. 691,129; 691,152 and 691,153, all filed on Dec. 18, 1967.

BACKGROUND OF THE INVENTION

The present invention relates to the improvement of the stability of aqueous latex emulsions and in particular to latex emulsions of natural or synthetic rubber.

The uses of natural and synthetic rubber are many and generally well known. Equally well known to those skilled in the art are the difficulties resulting from the inherent instability of these rubber compositions in the vulcanized as well as the unvulcanized or raw state.

It is equally well known that rubber latex either natural or synthetic is unstable when permitted to stand in an oxygen containing atmosphere for any extended time period. This instability of the rubber latex normally results in creaming, curdling, gelling or separation of the solid and liquid phases of the unstabilized rubber latex composition.

Copending U.S. patent application, Ser. No. 691,199, discloses novel rubber compositions having improved stability and containing certain polymethylated muconic acids and/or certain hydrocarbyl mono and diesters of those acids. The acids and esters disclosed in the foregoing copending application have been shown to be effective in the polymer latex emulsions as well as the finished vulcanized rubber product. Although the disclosed polymethylated acids and esters are effective as described in the above-noted application, difficulty can sometimes be encountered in properly incorporating the polymethylated muconic acid or ester in the natural and synthetic latex emulsions because of the low solubility of polymethylated muconic acids and their esters in aqueous solutions.

An improved form of stabilizer derived from polymethylated muconic acid has now been discovered which is more water soluble and, therefore, particularly effective to improve the stability of aqueous latex rubber emulsion compositions.

BRIEF SUMMARY OF THE INVENTION

It has now been discovered that certain metallic salts of certain polymethylated muconic acids (PMMA) are water soluble and particularly effective as stability improving additives in aqueous latex emulsions of synthetic and natural rubber compositions.

Specifically, it has been discovered that alkali and/or the alkaline earth metal salts and mixtures thereof of polymethylated muconic acids selected from the group consisting of $\alpha,\alpha'$-dimethyl muconic acid, $\alpha,\beta'$-dimethyl muconic acid, $\alpha,\alpha',\beta$-trimethyl muconic acid, $\alpha,\beta,\beta'$-trimethyl muconic acid, $\alpha,\alpha',\beta,\beta'$-tetramethyl muconic acid and mixtures thereof are particularly effective in improving the stability of aqueous latex emulsions of natural and synthetic elastomers when added thereto.

DESCRIPTION OF THE INVENTION

The polymethylated muconic acids hereinabove disclosed can exist in three isomeric forms, i.e., cis-cis, trans-trans and cis-trans. The alkali and/or the alkaline earth metal salts of all of these individual isomers and/or mixtures thereof are effective in the methods and compositions of the present invention.

The preparation of each of these isomeric forms of the $\alpha,\alpha'$-dimethyl muconic acid has been described in the prior art, e.g., Elvidge et al., J. Chem. Soc., pages 1026–1033 (1952). These authors show that oxidation of p-xylene by means of peracetic acid give the cis-cis form of the acid. The other isomeric forms were obtained indirectly by conversion of the cis-cis form. The cis-cis form of polymethylated muconic acids can also be obtained by biological oxidation of p-xylene utilizing special strains of microorganisms as disclosed in U.S. application, Ser. No. 561,736, filed June 30, 1966 and now U.S. Pat. No. 3,440,-158 issued Apr. 28, 1969.

The aqueous latex emulsion compositions suitable for use in the compositions of the present invention include the naturally occurring elastomers such as Hevea brasiliensis latex and gutta perch latex, as well as the compositions of synthetic elastomers prepared by means of emulsion polymerization and other techniques. Included among these synthetic elasomers are butyl polymers such as polybutene-1, polyisobutylene, polybutadiene as well as styrene-butadiene copolymers (SBR), ethylene-propylene-dicyclopentadiene terpolymers, polyisoprene, neoprene (polychloroprene), acrylonitrile-butadiene and acrylonitrile-butadiene-styrene polymers and all of the other well known synthetic elastomers that can be prepared into an aqueous emulsion.

The polymethylated muconic acid salts suitable for use in the compositions of the present invention are the mono and dialkali and/or alkaline earth metal salts of each of the polymethylated muconic acids herein disclosed. The alkali and/or alkaline earth metals of Group I-A and Group II-A of the Periodic Table of the Elements according to Mendeleeff including lithium, sodium, potassium, rubidium, cesium, magnesium, calcium, strontium and barium are generally suitable for use in providing the salts of polymethylated muconic acids used in the compositions of the present invention. The preferred acid salts suitable for use in this invention are the sodium, potassium, magnesium and calcium salts of the isomers of $\alpha,\alpha'$-dimethyl muconic acid.

The salts of PMMA hereinabove disclosed can be incorporated into the aqueous polymer latex emulsion in quantities in the range of 0.05 to 10.0 weight percent with the preferred concentration being in the range of 0.1 to 2.0 weight percent based on the weight of the whole composition.

The alkali and/or alkaline earth metal salts of any of the isomers of the above-disclosed polymethylated muconic acids can be prepared by any one of several procedures including well known methods of neutralizing organic acids with strong basic metal hydroxide solutions. For example, the methylated muconic acid can be dissolved in a suitable reaction solvent such as methanol, ethanol or water. A solution of dilute or concentrated alkaline earth metal hydroxide is thereafter added to the solution of the polymethylated muconic acid and the mixture is agitated for a time sufficient to provide the salt of the acid. Normally, 1 to 200 minutes is a sufficient time period to provide the products desired. The muconic acid salt can then be recovered from the solution by distilling off the solvent.

The preferred salts of the polymethylated muconic acids can be prepared by dissolving the PMMA in water and thereafter titrating the solution with 1 normal sodium or potassium hydroxide until most or all of the acid is converted to the mono or di salt whichever is preferred. The prepared solution of the respective methylated muconic acid salt in water can be thereafter directly added to the latex emulsion to be stabilized without recovering the muconic acid salts from solution.

One of the added advantages of using the methods and compositions of the present invention is that the rubber recovered from the latex emulsions hereinabove disclosed is also protected against oxidation. One procedure for processing rubber comprises coagulation of the rubber from the latex emulsion in which it is usually prepared. This coagulation is normally accomplished by means of acid precipitation. Generally, acetic or dilute sulfuric acid is added to the latex causing the emulsion to break into a solid rubber phase and a liquid phase.

When the stabilized latex emulsion compositions of the present invention are acid coagulated, the PMMA salt will revert to the acid form and precipitate with the solid rubber phase thereby maintaining most of the (PMMA) stabilizer in the rubber. The rubber is thereafter further processed with the acid form of the PMMA stabilizer dispersed in the solid rubber.

As a means of illustrating one mode of the method and compositions of the present invention, the following specific embodiment is given.

A styrene-butadiene copolymer latex emulsion is prepared by admixing 75 parts butadiene, 25 parts styrene, 180 parts water, 4.0 parts soap, 0.5 part dodecyl mercaptan and 0.3 part potassium persulfate in a closed agitated glass-lined reactor at a temperature of 50° C. The mixture in the reactor is agitated for a period of twelve hours after which the resultant polymer latex emulsion containing about 75% of the conversion product of the monomers to polymer is recovered. The recovered latex emulsion is then separated into two equal portions labelled sample A and sample B, respectively. Sample A is placed in a cotton-stoppered glass container. To sample B is added 1.0 weight percent, based on the weight of the whole composition, of the disodium salt of trans-trans $\alpha,\alpha'$-dimethyl muconic acid. Sample B is thereafter placed in a container identical to that containing sample A. At the end of 30 days, both samples are examined. Sample A, which is the unstabilized latex emulsion, exhibits the deleterious results of oxidation in the form of creaming, curdling and separation of the solids from the liquid phase of the emulsion. Sample B is substantially unchanged and exhibits no signs of the deleterious effect of oxidation.

The above demonstration clearly illustrates the improved stability of styrene-butadiene copolymer latex emulsions containing the disodium salt of trans-trans $\alpha,\alpha'$-dimethyl muconic acid.

Results substantially equivalent to those disclosed above can be obtained with other Group I–A salts of the polymethylated muconic acids herein disclosed including the potassium, rubidium and cesium mono and di salts. Also, magnesium, calcium, strontium and barium salts of the polymethylated muconic acids can be used with substantially equivalent results being obtained. Also, equivalent results can be accomplished with polymer latex emulsions of butadiene copolymers, ethylene-propylene copolymer latex emulsions, polyisoprene latex emulsions, neoprene latex emulsions as well as any of the other natural and synthetic latex emulsion rubber compositions.

In place of the disodium salts of trans-trans $\alpha,\alpha'$-dimethyl muconic acid shown in the example above, the sodium or potassium salts of the cis-cis, cis-trans and trans-trans isomers of $\alpha,\beta'$-dimethyl muconic acid, $\alpha,\alpha',\beta$-trimethyl muconic acid, $\alpha,\beta,\beta'$-trimethyl muconic acid, $\alpha,\alpha',\beta,\beta'$-tetramethyl muconic acid and mixtures thereof can be substituted with any of the rubber latex emulsions disclosed herein with substantially equivalent results being obtained.

We claim:
1. Aqueous latex emulsion compositions having improved emulsion stability comprising a rubber latex emulsion selected from the group consisting of natural rubber and synthetic rubber derived from an ethylenically unsaturated monomer containing 0.05 to 10.0 weight percent based on the whole composition of a stabilizer selected from the group consisting of the alkali and/or alkaline earth metal salts of polymethylated muconic acids, selected from the group consisting of $\alpha,\alpha'$-dimethyl muconic acid, $\alpha,\beta'$-dimethyl muconic acid, $\alpha,\alpha',\beta$-trimethyl muconic acid, $\alpha,\beta,\beta'$-trimethyl muconic acid, $\alpha,\alpha',\beta,\beta'$-tetramethyl muconic acid and mixtures thereof.

2. A composition according to claim 1 wherein the stabilizer is the sodium or potassium salt of $\alpha,\alpha'$-dimethyl muconic acid.

3. A composition according to claim 2 wherein the rubber latex is styrene butadiene copolymer latex.

4. A composition according to claim 3 wherein the stabilizer concentration is in the range of 0.1 to 2.0 weight percent of the whole composition.

5. A composition according to claim 3 wherein the stabilizer is the trans-trans isomer of the sodium or potassium salt of $\alpha,\alpha'$-dimethyl muconic acid.

6. A composition according to claim 2 wherein the rubber latex is Hevea brasiliensis latex.

7. A composition according to claim 6 wherein the stabilizer concentration is in the range of 0.1 to 2.0 weight percent of the whole composition.

8. A composition according to claim 6 wherein the stabilizer is the trans-trans isomer of the sodium or potassium salt of $\alpha,\alpha'$-dimethyl muconic acid.

9. A composition according to claim 1 wherein the stabilizer is the calcium or magnesium salt of $\alpha,\alpha'$-dimethyl muconic acid.

10. A composition according to claim 9 wherein the rubber latex is styrene-butadiene copolymer latex.

11. A composition according to claim 10 wherein the stabilizer concentration is in the range of 0.1 to 2.0 weight percent of the whole composition.

12. A composition according to claim 10 wherein the stabilizer is the trans-trans isomer of the calcium or magnesium salt of $\alpha,\alpha'$-dimethyl muconic acid.

13. A composition according to claim 9 wherein the rubber latex is Hevea brasiliensis latex.

14. A composition according to claim 13 wherein the stabilizer concentration is in the range of 0.1 to 2.0 weight percent of the whole composition.

15. A composition according to claim 13 wherein the stabilizer is the trans-trans isomer of the calcium or magnesium salt of $\alpha,\alpha'$-dimethyl muconic acid.

16. The method of preparing a latex emulsion composition according to claim 1 which comprises adding to an unstabilized rubber latex emulsion 0.05 to 10.0 weight percent based on the whole composition of a stabilizer selected from the group consisting of the alkali and/or alkaline earth metal salts of polymethylated muconic acids selected from the group consisting of $\alpha,\alpha'$-dimethyl muconic acid, $\alpha,\beta'$-dimethyl muconic acid, $\alpha,\alpha',\beta$-trimethyl muconic acid, $\alpha,\beta,\beta'$-trimethyl muconic acid, $\alpha,\alpha',\beta,\beta'$-tetramethyl muconic acid and mixtures thereof.

References Cited
UNITED STATES PATENTS

| | | | |
|---|---|---|---|
| 3,280,065 | 10/1966 | Langer | 260—815 |
| 2,932,678 | 4/1960 | Sekaran et al. | 260—815 |

JULIUS FROME, Primary Examiner

A. H. KOECKERT, Assistant Examiner

U.S. Cl. X.R.

260—29.6, 45.85, 739, 815